Jan. 9, 1934.    W. L. HUNTER ET AL    1,942,426
VALVE
Filed Jan. 16, 1931
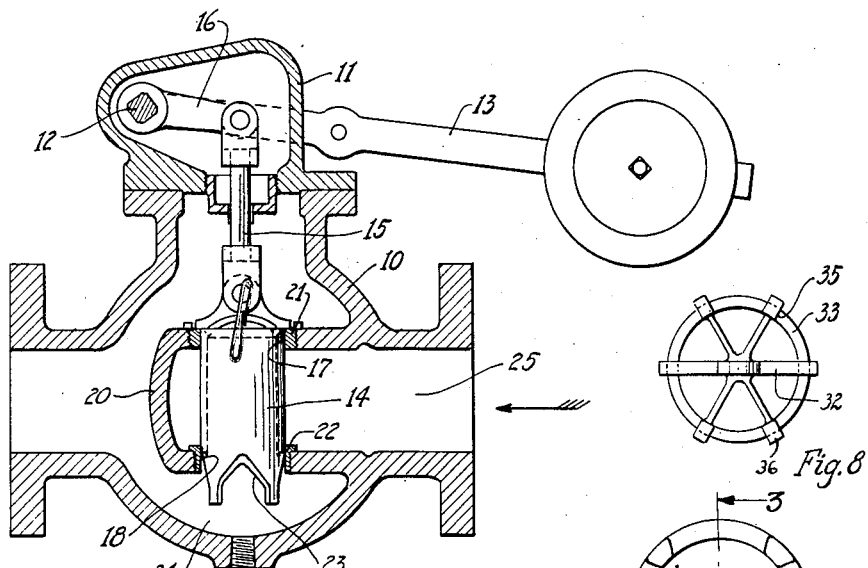
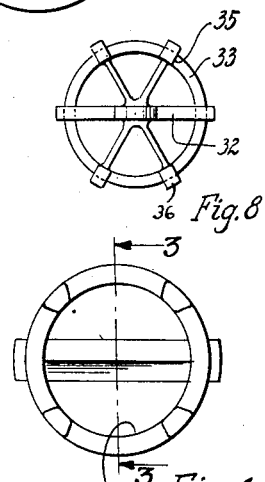
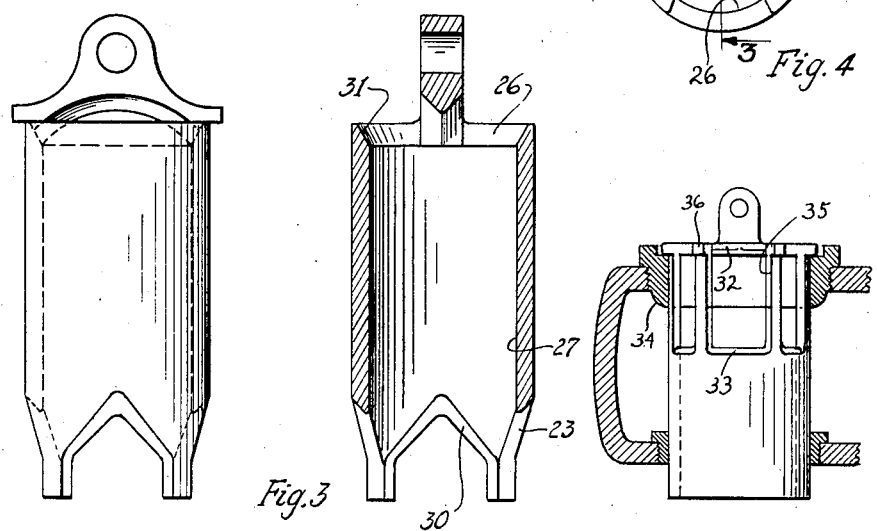
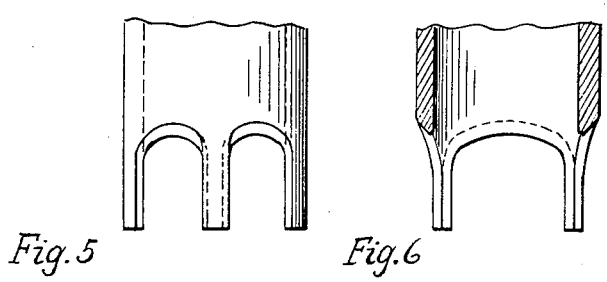
INVENTORS:
William L. Hunter
Harry H. Weining
By E. J. Andrews
Atty.

Patented Jan. 9, 1934

1,942,426

UNITED STATES PATENT OFFICE 1,942,426

VALVE

William L. Hunter and Harry H. Weining, Erie, Pa., assignors to Northern Equipment Company, Erie, Pa., a corporation of Pennsylvania Application January 16, 1931. Serial No. 509,153

8 Claims. (Cl. 251—78)

This invention relates to valves, and particularly to valves of the so-called balanced type. We have found that the ordinary so-called balanced valve is balanced at most only to a limited extent, ordinarily when the valve is closed. When the water begins to flow through the valve to any appreciable extent, this balance is materially disturbed. One of the objects of this invention is to provide a valve so arranged that it will be substantially balanced when opened any ordinary amount. Our purpose has been to provide a valve that will be balanced, not only when closed, but will be at least substantially balanced when in use, allowing the water or gas to flow through normally. A further object of the invention is to reduce or entirely eliminate any chattering tendency of the valve.

Of the drawing, Fig. 1 is a vertical, central sectional view of a valve with its operating means, which embodies the features of our invention; Fig. 2 is an enlarged elevation of the valve plunger; Fig. 3 is a central, sectional view of the plunger at right angles to Fig. 2 and along the line 3—3 of Fig. 4; Fig. 4 is a bottom view of the plunger; Figs. 5 and 6 are fragmental views, similar to Figs. 2 and 3, showing a modified form of valve ports; Fig. 7 shows a modified form of plunger; and Fig. 8 shows a modified form of valve seat.

The valve comprises an ordinary type of casing 10, which has, in this instance, a hood 11 mounted thereon. A spindle 12 passes through the hood and to the outer end of the spindle is fixed an arm 13, by means of which the spindle is rocked to operate the valve plunger 14. The plunger is connected to the spindle 12 in any suitable manner, such as by means of a link 15 pivoted to an arm 16, the arm being fixed to the inner end of the spindle.

The plunger 14 operates in a usual manner in the ports 17 and 18 formed in the cup-shaped partition 20 which divides the inner chamber of the valve 10 into two compartments. In the ports of the partition, seats 21 and 22 are provided which have the ordinary function of valve seats of this nature.

The valve plunger is formed with a view of providing a valve which is substantially balanced in any position of the plunger. The valve is entirely balanced when closed, and in this position the arrangement is somewhat similar to the ordinary type of balanced valve. But the plunger differs materially from the ordinary type of plunger. The plunger preferably comprises a tubular member with no ports near its upper end in the side walls. In the wall at its lower end are formed ports 23 and, as the plunger is elevated, the fluid passes inwardly in the direction of the arrow, and from the chamber 25 through these ports into the outlet chamber 24. The upper end of the plunger has a port 26, so that the fluid also is free to flow through the ports 23 and upwardly out of the port 26. In fact, it will be seen that the upper and lower portions of the outlet chamber are freely in communication with each other by means of the bore 27 of the plunger.

In operation, as the valve opens, the fluid flows inwardly through the chamber 25 and the ports 23 into the chamber 24, and also upwardly through the bore 27 and the port 26, and out of the valve casing. So that the fluid is flowing into both the upper and lower portions of the outlet chamber through the ports 23. We have found by numerous tests that, with this arrangement, the valve is substantially balanced for all ordinary positions of the plunger.

While the shape of the ports 23 may be varied somewhat, yet, we prefer the V-shaped ports indicated. U-shaped ports, such as are shown in Figs. 5 and 6, also may be used, and somewhat the same results would be obtained. We also prefer to form the bevels 30 in the walls of the ports 23 at an angle of about 45°, and also to form the bevels 31 in the walls of the ports 26. However, these bevels may be varied, and the edges may be rounded if desired. It will be understood that the unbalancing of the valve is produced in part by cavitation, owing to the surging of the fluid as it flows through the ports, and this bevelling assists in reducing that materially. Also, the bevelling reduces or entirely eliminates the chattering tendency of the valve under certain conditions.

While we have described a particular form of plunger and ports for the purpose of this specification, it will be understood that modifications therein may be made by those skilled in the art without departing from the spirit of our invention. It will also be understood that the valve which we described and claimed is applicable to various purposes, and also it is not our desire to limit it to use with liquids or with gases, as it may be used in the transmission of any fluids, and it will be in all ordinary cases substantially balanced.

In Figs. 7 and 8, a modified form of plunger and valve seats are shown. The ports 35 are in the upper or connected end of the plunger. This plunger is open at both ends and has cross bars 32 to which the operating means are connected.

The walls 33 of the ports are bevelled at angles from 30° to 60°, depending on the conditions. The outer corner 34 of the upper valve seat which projects into the interior of the cup-shaped partition is rounded to further assist in balancing and in eliminating chattering. The seat with the rounded corner is preferably used at the port end of the plunger but the two seats may be similar. The valve is wide open when the lugs 36 rest on the upper seat.

We claim as our invention:

1. In a valve, a casing having an inner chamber with an inlet and an outlet, a cup-shaped partition in said chamber having two coaxial openings in its opposite walls, a cylindrical plunger movably mounted in said openings, said plunger having a bore extending longitudinally therethrough, and having ports through its wall at one end only, and means for reciprocating said plunger to move said ports through one of said coaxial openings.

2. In a valve as claimed in claim 1, said ports being V-shaped.

3. In a valve as claimed in claim 1, the walls of said ports being bevelled.

4. In a valve as claimed in claim 1, said ports being U-shaped and having their walls bevelled on the outer sides.

5. In a valve as claimed in claim 1, said ports being V-shaped and having their walls inclined to the outer surfaces of the plunger about 45°.

6. A balanced valve having an inner chamber, a cup-shaped partition in said chamber, two coaxial openings in said partition, a tubular plunger slidably mounted in said openings, said plunger having a port formed through its wall adjacent one end, means for reciprocating said plunger to move a portion of said port through one of said coaxial openings, the remainder of the plunger wall being imperforate.

7. A balanced valve as claimed in claim 6, in which said reciprocating means are connected with the ported end of said plunger, said port being in the form of a parallelogram and having a bevelled wall at one end.

8. In a valve as claimed in claim 1, a seat member in one of the coaxial openings projecting into the interior of the cup-shaped partition and having the outer corner of its wall rounded.

WILLIAM L. HUNTER.
HARRY H. WEINING.